US005103109A

United States Patent [19]

Khazam et al.

[11] Patent Number: 5,103,109

[45] Date of Patent: Apr. 7, 1992

[54] GROUND-LOOP INTERRUPTION CIRCUIT

[75] Inventors: Moses Khazam, Lexington; Karl Karash, Berlin; Charles P. Smith, Framingham; Anthony J. Suto, Leominster; Fadi H. Daou, Roslindale, all of Mass.

[73] Assignee: GenRad, Inc., Concord, Mass.

[21] Appl. No.: 547,802

[22] Filed: Jul. 3, 1990

[51] Int. Cl.[5] .......................... H02J 1/00; H02J 13/00

[52] U.S. Cl. ....................................... 307/53; 323/268

[58] Field of Search ....................... 307/34, 52, 53, 61, 307/63, 77, 561; 323/266, 267, 270, 268, 272

[56] References Cited

U.S. PATENT DOCUMENTS

| | | | |
|---|---|---|---|
| 4,335,445 | 6/1982 | Nercessian | 364/900 |
| 4,748,340 | 5/1988 | Schmidt | 307/53 |

*Primary Examiner*—A. D. Pellinen
*Assistant Examiner*—D. Le
*Attorney, Agent, or Firm*—Cesari & McKenna

[57] ABSTRACT

An output circuit (62) for generating a signal in the form of a voltage between an output signal node and an output reference node (60) receives power from a pair of voltage regulators (Q1 and 68, Q2 and 70). The regulators are connected in power-circuit series so as to be powered by the difference between the output potentials of two opposite-polarity supplies without a direct low-impedance connection between the power-supply ground (73) and the output reference node (60). To avoid large current flow in any external path between an output reference node (60) of an electronic circuit and the ground node (73) of its power supply, a current sensor (R1, R2, 86) senses the net current that the power supplies provide to the circuitry that includes the regulators, and it controls variable loads (Q3, Q4) that selectively drive current into and draw current from the reference node (60) so as to drive the net current to zero.

4 Claims, 3 Drawing Sheets

GROUND-LOOP INTERRUPTION CIRCUIT

BACKGROUND OF THE INVENTION

The present invention relates to power-supply arrangements for electronic circuitry and in particular to arrangements for minimizing ground currents.

A typical ground-current problem encountered in electronic circuits can be appreciated by reference to FIG. 1. FIG. 1 depicts, in conceptual form, a circuit module 10 at a first location that produces a signal having high-frequency components and transmits it over a signal medium 12 in the form of a coaxial cable to a remote location, where the signal drives a load 14. The coaxial cable 12 has a center conductor 16 and an outer, shield conductor 18, both of which are connected to the circuit module 10. The shield conductor 18 is connected both to a signal-reference, or output-ground, node 20 on the circuit module 10 and to a ground node 22 at the remote location. The coaxial cable acts to localize the fields associated with the transmitted signals so that radiation loss and interference are minimized.

FIG. 1 further depicts circuitry for supplying power to the circuit module 10. A transformer 24 steps voltage down from a 110- or 220-volt AC power source. In the illustrated circuit, the resultant stepped-down voltages are applied through two rectifier bridges 25 and 26 to respective voltage regulators 27 and 28. The voltage regulators produce positive and negative regulated voltages referenced to a power-supply ground 30. All of this power-supply circuitry may supply power to many circuit boards in a circuit cabinet.

In the absence of appropriate precautions, this type of arrangement can result in a ground loop. For example, suppose that load 14 is located on a circuit board mounted at a different location in the cabinet that contains module 10 and that that circuit board is powered by the power supply depicted at the left of FIG. 1. In such a situation, ground nodes 22 and 30 ma be connected to each other through the cabinet chassis or the ground planes of other boards, so there may be a very-low-impedance path, external to the module 10, between the two nodes. Since the signal transmission along the coaxial signal medium 12 necessitates some current flow in the shield connector 18 and thus some potential difference between its ends, there is a potential difference between ground node 20 in the circuit module 10 and ground node 22 at the remote location. Now, if nodes 20 and 30 were simply different points on the ground plane that contains module 10, this potential difference would impose a potential difference between nodes 22 and 30 that could result in high current flow in the external low-impedance path from ground node 22 to ground node 30. The resultant fields and ground voltages would be undesirable since they could be significant noise sources. This would be the result of a ground loop; there would be a circular low-impedance path from node 20 to node 22 and node 30 and back to node 20 that allows module 10 to drive not only cable 12 and load 14, as it should, but also the external path, which it should not.

To avoid this problem, designers have employed "split grounds" to break the ground loop. For instance, in the typical case in which the loop results from an external path to the ground node of a common power supply, a module containing output circuitry that might otherwise drive current through the external path is so arranged as to provide no direct low-impedance path between the power-supply ground node (such as node 30) and the module's output ground node (such as node 20), and it permits the output ground node to "float" with respect to the power-supply ground node, i.e., to assume the voltage level that causes no significant current flow in the external path. In such an arrangement, communication across the boundary where the loop has been "broken" must occur in ways that do not rely on ground references. For instance, communication could occur by optical coupling or, as FIG. 1 illustrates, by differential signals.

Specifically, the module 10 of FIG. 1 breaks the loop so as to isolate two devices 32 and 34 electrically from three other devices 36, 38, and 40. Transmission occurs across the boundary 42 between the resultant circuit segments by way of differential signals; that is, device 34 transmits a signal by way of two conductors 44 and 46, which are connected to a difference-mode device 36 that responds to the voltage differences between the signals rather than to the voltage difference between a single conductor and a common ground node.

Although this approach is effective, it tends to be expensive and space-consuming. The reason is that it requires separate power supplies for most circuit boards. FIG. 1 represents such separate power supplies as the output nodes 48 and 49 of separate transformer secondaries and bridge circuits (not shown) connected to a pair of opposite-polarity voltage regulators 50 and 51 corresponding to similar circuits 27 and 28. Since such a separate power supply might be required for every circuit board in a circuit cabinet, the expense and space penalties can clearly be significant and, in some cases, prohibitive.

One way to avoid such expense and space penalties is to employ DC-to-DC converters, whose DC output circuitry is electrically isolated from their DC input circuitry. The converters may all be powered by a common supply and in turn provide power to the output circuitry. DC-to-DC converters thus yield the intended result without employing separate power supplies.

However, the DC-to-DC-converter approach is limited in its range of applications. The reason for this is that a DC-to-DC converter employs an oscillator powered by the input DC voltage, and the oscillator output is magnetically coupled to a rectifier/regulator circuit to produce the electrically isolated DC output voltage. For the magnetic coupling to be performed efficiently in a small space, the oscillator must operate at a high frequency, so it is a significant noise source in the circuit. Accordingly, the DC-to-DC-converter approach is applicable only if such noise can be tolerated or large-size converters are acceptable.

SUMMARY OF THE INVENTION

The present invention enables the potential difference between input and output grounds to assume the external-current-minimizing value provided by prior loop-interruption approaches without exacting the size or expense penalties that characterize those approaches.

In the present invention, the output circuit that generates the differential signal transmitted over the signal medium is powered directly by the power supplies by being electrically connected between their positive and negative outputs without connection to the power-supply ground. Ordinarily, the result of such an arrangement would be to impress a potential difference between the power-supply ground and the signal reference, or output ground, that could cause the output circuit to drive current through the external ground path. In accordance with the present invention, however, a current sensor senses the net current that flows in the module between the power supplies and the output circuit, and it controls a variable load in the output circuit so as selectively to draw from and drive into the reference node currents of such magnitudes as to tend to drive to zero the net current that the power supplies provide to the operational circuit. As a consequence, the current that the module causes in the external ground path is minimized.

BRIEF DESCRIPTION OF THE DRAWINGS

These and further features and advantages of the invention are described in connection with the accompanying drawings, in which.

DETAILED DESCRIPTION OF AN ILLUSTRATIVE EMBODIMENT

Figure 1:
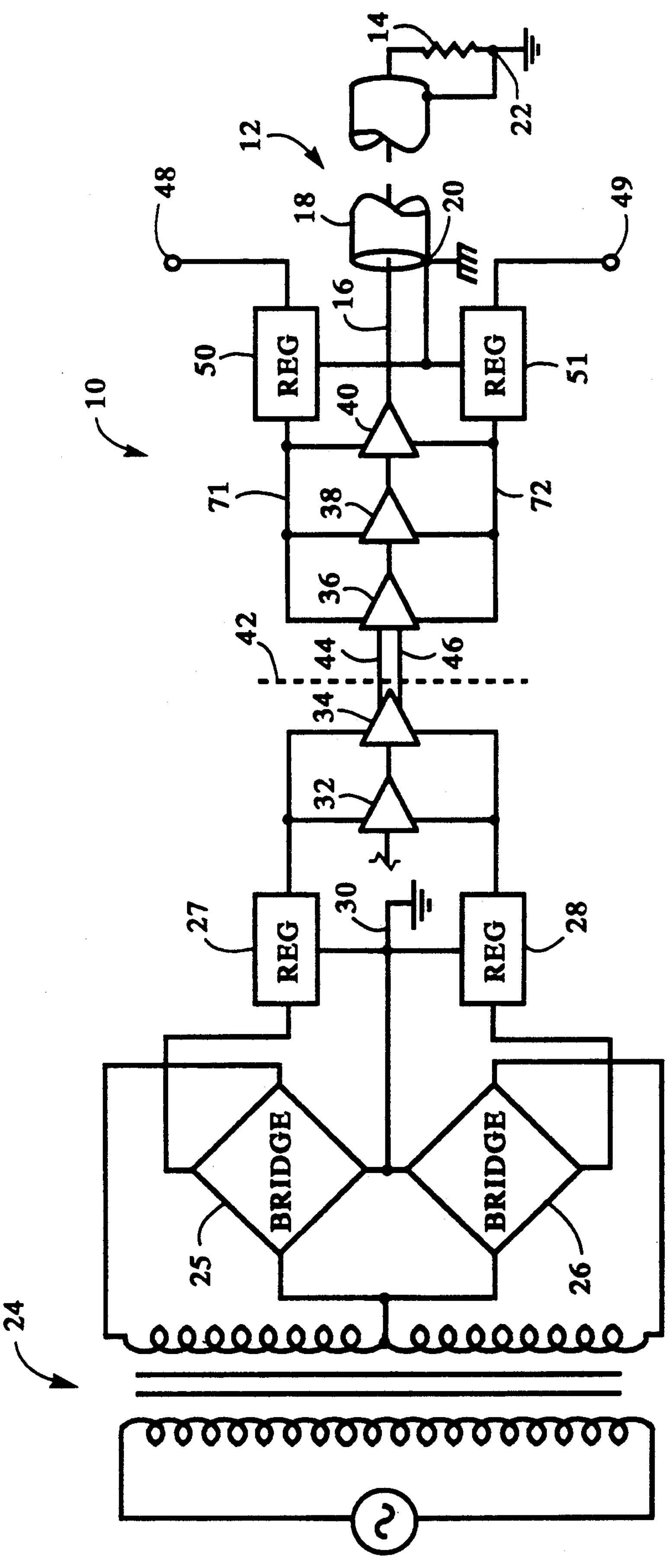
FIG. 1 (PRIOR ART)
FIG. 1 is a schematic diagram of a circuit module and related circuitry employing a prior-art approach to minimizing ground-loop currents.

The teachings of the present invention are applicable to any circuit of the general type depicted in FIG. 1, namely, a circuit module to which external-path current from the module's output circuit is to be minimized. For the sake of simplicity, FIG. 2, which depicts an embodiment of the present invention, omits conventionally powered operational circuitry of the type exemplified by elements 32 and 34 of FIG. 1, and it also omits the power-supply circuitry from which those circuits are powered. Embodiments of the present invention may include such circuitry, but it is not important to an explanation of the present invention.

Figure 2:
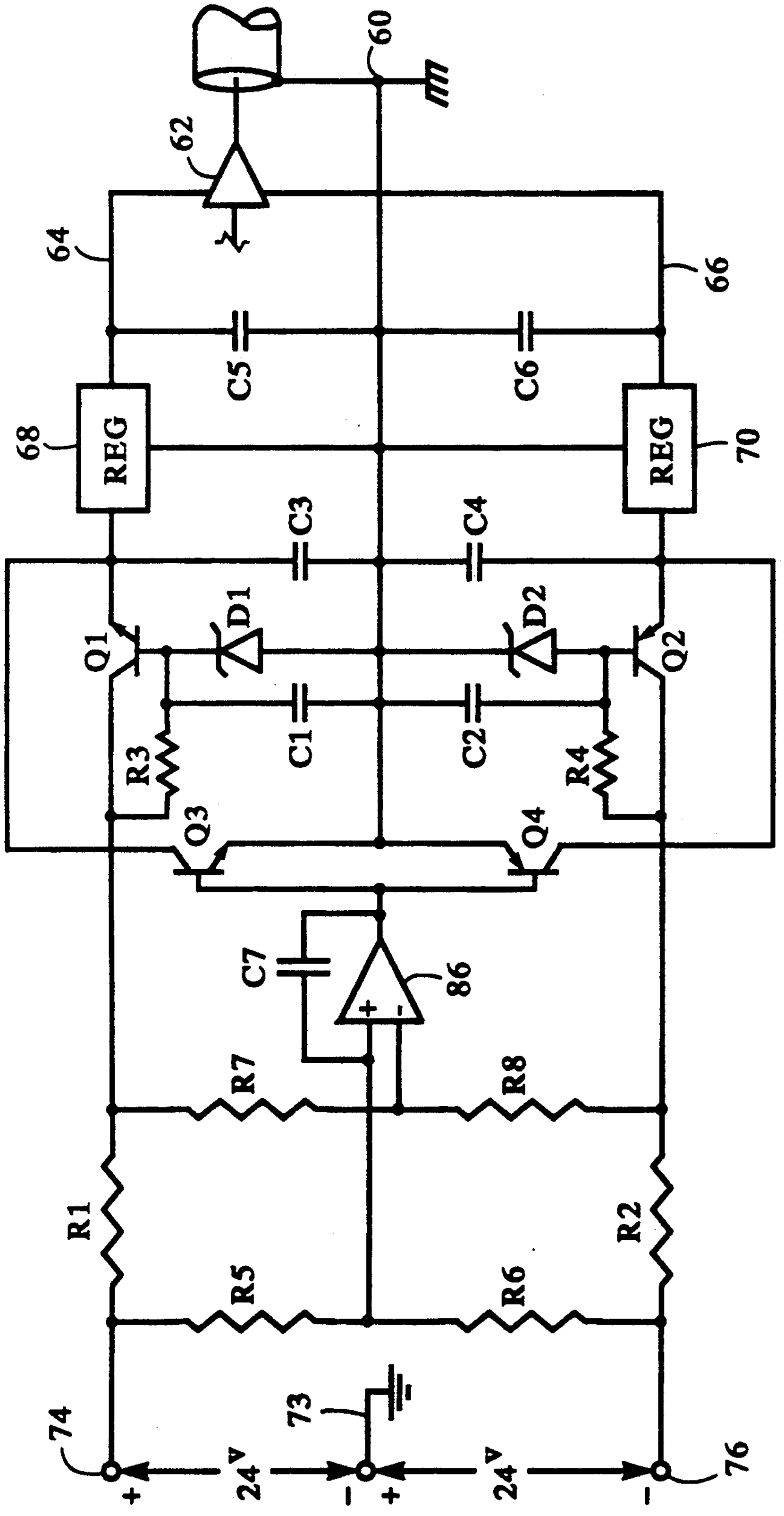
FIG. 2 is a schematic diagram of the power-circuit part of a circuit module employing the teachings of the present invention.

In FIG. 2, node 60 is the output reference node; i.e., it corresponds to node 20 of FIG. 1. Output circuitry 62 in the FIG. 2 module corresponds to the output circuitry 36, 38, and 40 of FIG. 1. It receives its power by way of supply rails 64 and 66 from voltage regulators 68 and 70. Supply rails 64 and 66 correspond to supply rails 71 and 72 of FIG. 1, which carry the outputs of voltage regulators 50 and 51. Instead of receiving power from a separate power supply, however, the voltage regulators for the output segment of the FIG.-2 circuit module receive power by electrical coupling to the main power supplies, i.e., from supplies referenced to the ground node 73 to which it is the purpose of the split ground to prevent external-path current flow. As a consequence, the FIG.-2 arrangement does not suffer the size or noise penalties imposed by magnetic coupling.

FIG. 2 depicts an example of such electrical coupling. In FIG. 2, nodes 74 and 76 represent the output terminals of positive and negative power supplies, respectively, and correspond to the output terminals of bridges 25 and 26. They carry unregulated plus and minus 24-volt voltage levels. The potential difference between these plus and minus 24-volt unregulated outputs (which are referenced the main first ground node 73) is applied through low-resistance current-sensing resistors R1 and R2 to two opposite-polarity voltage regulators whose first stages include transistors Q1 and Q2, respectively.

The bases of transistors Q1 and Q2 are connected to respective zener diodes D1 and D2, which are in respective paths from the positive and negative supply nodes 74 and 76 to the second ground node 60 through respective resistors R3 and R4. Resistors R3 and R4 can be replaced with current sources. The capacitors C1 and C2 connected in parallel with the zener diodes D1 and D2 insure that the output impedances of those parallel combinations to high-frequency signal components are very low. Diodes D1 and D2 are 20.7– volt zeners, and those skilled in the art will accordingly recognize that the first-stage circuits act to maintain plus and minus 20 volts, respectively, at the output nodes represented by the emitter terminals of transistors Q1 and Q2. Further capacitors C3 and C4 are connected from these output terminals to the second ground node 60 for further filtering, and the plus and minus 20-volt potentials are respectively applied across the power terminals of further voltage regulators 68 and 70, which are shown simply as blocks because they would typically be provided as off-the-shelf regulator chips. These regulators maintain the plus and minus 15-volt potentials on the supply rails 64 and 66 that power the output circuit 62. As is typical, further capacitors C5 and C6 filter the regulator outputs.

In short, transistor Q1, zener diode D1, and regulator 68 constitute a composite regulator, corresponding to regulator 50 of FIG. 1, in which the input terminal is the collector terminal of Q1, the output terminal is node 66, and the common terminal is the output ground node 60. Similarly, the circuit that includes transistor Q2, zener diode D2, and regulator 70 constitutes a composite regulator in which the input terminal is the collector of transistor Q2, the output terminal is node 66, and the common terminal, like that of the other composite regulator, is the output ground node 60. These two composite regulators are connected in power-circuit series; that is, the terminal pair across which power is applied to the upper composite regulator is connected in series with the terminal pair across which power is applied to the lower composite regulator so that power can be applied to both by applying a potential difference across the terminals of their series combination.

The circuitry of FIG. 2 supplies power to the regulators by connection of the potential difference between the unregulated plus and minus 24-volt potentials from the main power supplies across the power-circuit series combination of the two composite voltage regulators. Accordingly, although the two unregulated voltages are referenced to the power-supply ground node 73, they can power the voltage regulators for the output circuit, which maintain voltages referenced to the output ground node 60, without providing a low-impedance connection between those nodes.

Without further provisions of the present invention to be described below, however, this arrangement would not solve the ground-loop problem. Although the circuitry as described so far does indeed use sources referenced to one ground node to power regulators referenced to a different node in such a manner as to allow those nodes to assume different potentials, the different ground nodes do not actually "float" with respect to each other. Their relative potentials are set by the bias levels in transistors Q1 and Q2 and regulators 68 and 70. These bias levels are those required to maintain the desired output voltage levels, and they would not necessarily result in the "floating" potential difference, which eliminates current in the external ground path, without appropriate compensation.

According to the present invention, however, variable loads in the form of transistors Q3 and Q4 are provided between the composite voltage regulators and the second ground node 60 and are adjusted so as to cause that node to assume the "floating" potential. Specifically, a differential amplifier 86, to which a feedback capacitor C7 has been connected for stability, receives at its inverting input terminal the output of a voltage divider, consisting of resistors R5 and R6, connected across the unregulated plus and minus 24-volt potentials. The non-inverting input terminal of the differential amplifier 86 receives the output of another voltage divider, this one consisting of resistors R7 and R8, which is also connected across the 24-volt potentials but downstream of the two small-value current-sensing resistors R1 and R2.

The values of resistors R1 and R5 bear the same relationship to those of R2 and R6, respectively, as the value of R7 does to that of R8. Furthermore, resistors R1 and R2 are so positioned as to carry substantially all of the current that flows to and from the output circuit. The algebraic sum of the currents that flow from nodes 74 and 76 to the right in FIG. 2 is therefore zero when the voltages across R1 and R2 are equal.

Consequently, the output of the amplifier 86 is small so long as the net current from the power supply to the module is zero, i.e., so long as the current flowing within the module from the supply to the output circuit is the same as the current flowing within the module from the output circuit to the supply. This situation prevails only when the current flowing from the module to remote locations is equal to that flowing back from the remote locations to the module, i.e., when the module causes no current to flow in an external path. If the currents are not equal, the amplifier 86 drives transistor Q3 or Q4 so as to drive into or draw from reference node 60 the level of current required to equalize the supply currents, and thus minimize the external-path current that the module causes. If all other potential ground loops are similarly interrupted, unwanted current flow in long external ground paths will be minimized.

Clearly, the invention can be practiced in many embodiments that differ considerably from that depicted in the drawings. For instance, there is no reason in principle why a voltage regulator of the two-stage type depicted in FIG. 2 must be employed in order to practice the invention. The reason why the arrangement of FIG. 2 employs a two-stage regulator is that the off-the-shelf regulator chips 68 and 70 employed in that embodiment require large input capacitors such as capacitors C3 and C4, which would provide a high-frequency short circuit between grounds 60 and 73 in the absence of transistors Q1 and Q2; that is, without the intervening high-impedance circuits Q1 and Q2, capacitors C3 and C4 would slow the adjustment of the potential difference between the two grounds to the values required to prevent significant external-path flow.

It also is not necessary for the variable loads Q3 and Q4 to be connected at one end between the two regulator stages as they are in the illustrated embodiment. Clearly, the basic principles of the invention can be practiced if those connections are made to the left of transistors Q1 and Q2 or to the right of the regulators 68 and 70.

Moreover, although the drawings depict an arrangement that includes two supplies of equal magnitude but opposite polarity, there is no reason in principle why only two supplies should be employed or why the opposite supplies must be equal in magnitude; for almost every practical embodiment of the invention, the requirement is only that two of the supplies be of opposite polarity.

Figure 3:
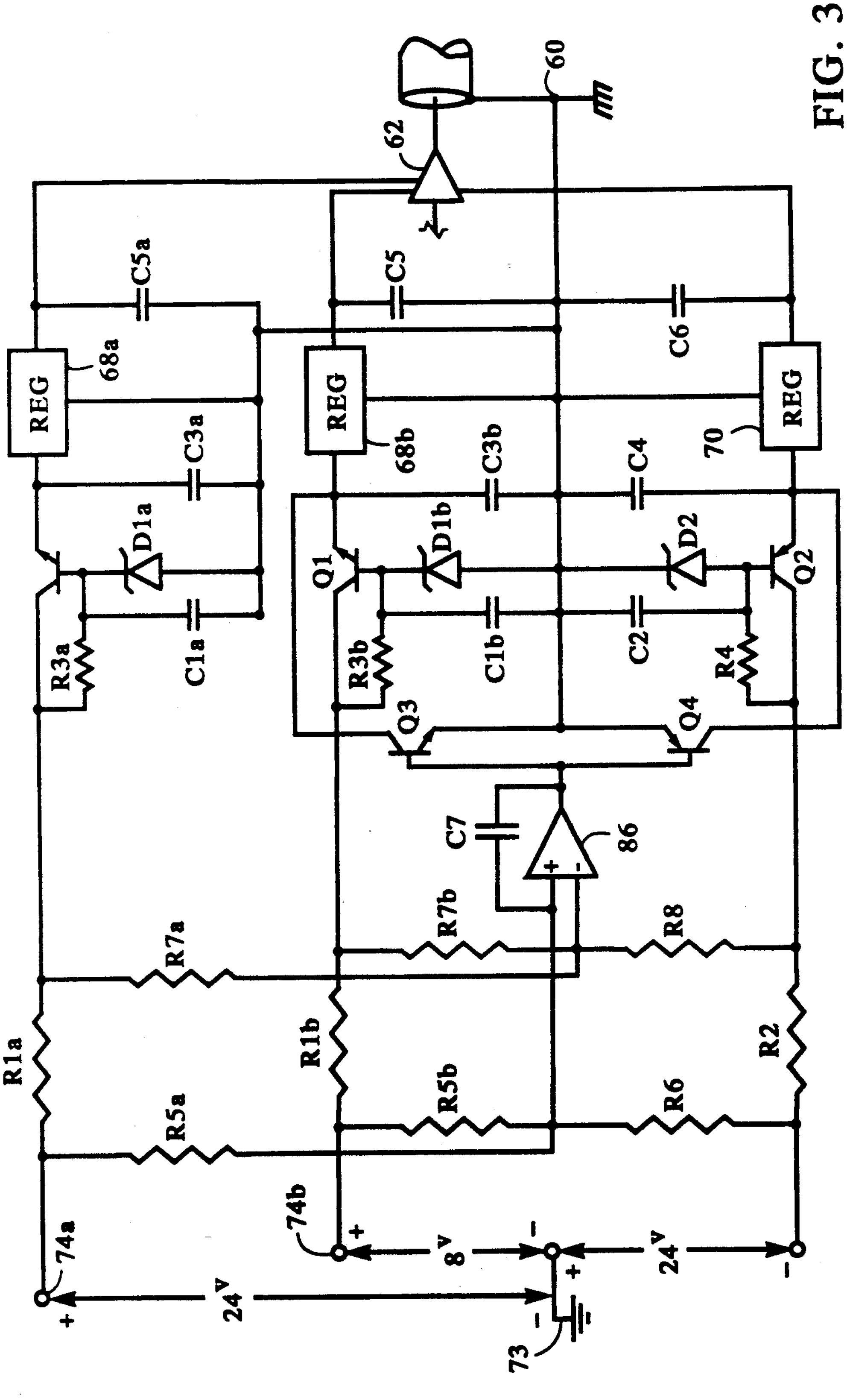
FIG. 3 is a schematic diagram of the power-circuit part of an alternate embodiment of the present invention.

For example, FIG. 3 depicts a circuit arrangement that is similar to that of FIG. 2, with the exception that it employs three voltage levels, and thus three supplies, rather than two. Like the arrangement of FIG. 2, that of FIG. 3 employs one negative supply, but it employs two positive supplies and related circuitry in place of the single supply and related circuitry of FIG. 2. Accordingly, components in the negative-supply part of the circuit of FIG. 3 bear reference numerals identical to those of the corresponding elements in FIG. 2, while the reference numerals for the two counterparts of each element in the positive-supply parts of the FIG.-3 arrangement differ from those of the corresponding components in FIG. 2 only in the addition of suffixes a and b.

Because the operation of the circuit of FIG. 3 largely parallels that of the circuit of FIG. 2, the discussion of the circuit of FIG. 3 will be limited to a couple of observations.

The first is that the compensation circuit comprising transistors Q3 and Q4 is connected between the negative-supply part of the circuit and only one of the positive branches, namely, the one with the suffix b. This, of course, is not necessary; the compensating current could be drawn from either branch, and, with appropriate adjustments, could be drawn from both.

The second observation is that the values of the sensing-network resistors are chosen, as before, to result in equal changes at the non-inverting input port of the sense amplifier 86 for equal currents. This means that the current-sensing resistors should produce voltage drops in proportion to the values of their corresponding summing-junction resistors:

$$R_{1a}=R_2R_{7a}/R_8$$

and $$R_{1b}=R_2R_{7b}/R_8.$$

With these parameters, the circuit of FIG. 3 operates similarly to that of FIG. 2.

In view of the foregoing description, it is apparent that the present invention can be employed in a wide range of embodiments and accordingly constitutes a significant advance in the art.

I claim:

1. An electronic circuit comprising:

A) a signal medium comprising a signal conductor and a reference conductor and extending from a first location to a second location;

B) a plurality of power supplies, including a positive power supply and a negative power supply, for maintaining respective supply potentials with respect to a common ground node unconnected to the reference conductor at the first location;

C) an operational circuit, electrically connected to the power supplies so as to be powered by the difference between the supply potentials, and including signal and reference nodes connected at the first location to the signal, and reference conductors, respectively, for generating as an output signal a voltage between the signal and reference nodes so as to transmit the output signal along the signal medium;

D) current sensors for sensing the net current that flows from the power supplies to the operational circuit; and E) variable loads responsive to the current sensors selectively to draw from and drive into the reference node currents of such magnitudes as to tend to drive to zero the net current supplied by the voltage sources to the operational circuit.

2. An electronic circuit as defined in claim 1 wherein the operational circuit includes at least one voltage regulator, including a regulator output terminal and being connected to the power supplies so as to be powered thereby, for maintaining a regulated voltage between the reference node and the regulator output terminal, and wherein the operational circuit further includes a signal-generating circuit, powered at least in part by the voltage regulator, for generating the signal applied to the signal conductor.

3. An electronic circuit as defined in claim 2 further including a second voltage regulator, including a second regulator output terminal and being connected in power-circuit series with the first-mentioned voltage regulator so as to be powered by the difference between the supply potentials, for maintaining a regulated voltage between the reference node and the second regulator output terminal.

4. An electronic circuit as defined in claim 3 wherein the signal circuit is powered by both the first and the second voltage regulators.

* * * * *